Figure 1:
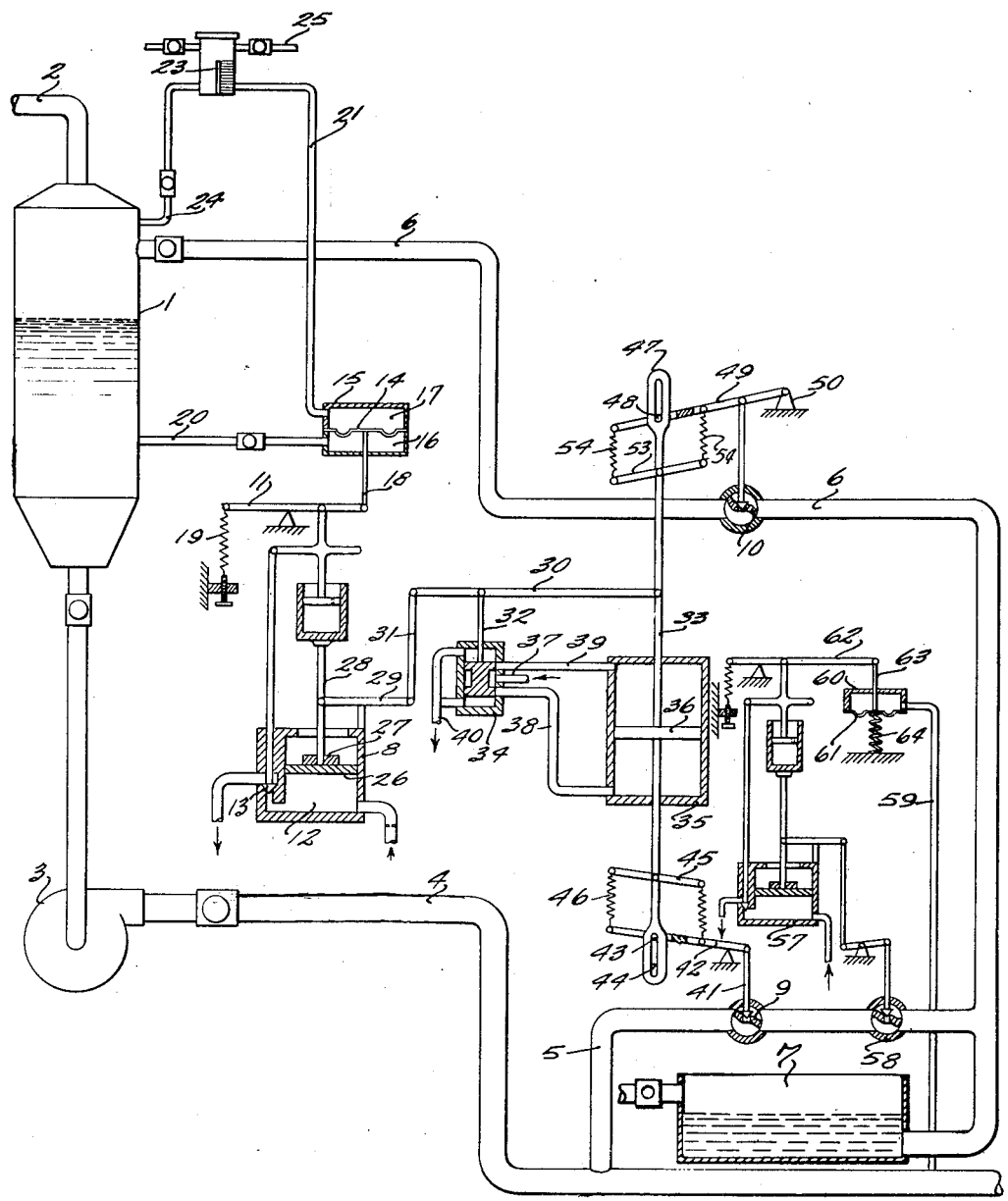

Sept. 19, 1933.  C. H. SMOOT  1,927,506
CONDENSATE CIRCULATION CONTROL FOR BOILER PLANTS
Filed May 28, 1930  2 Sheets-Sheet 1

INVENTOR
Charles H. Smoot
BY
ATTORNEYS

Sept. 19, 1933.  C. H. SMOOT  1,927,506
CONDENSATE CIRCULATION CONTROL FOR BOILER PLANTS
Filed May 28, 1930  2 Sheets-Sheet 2
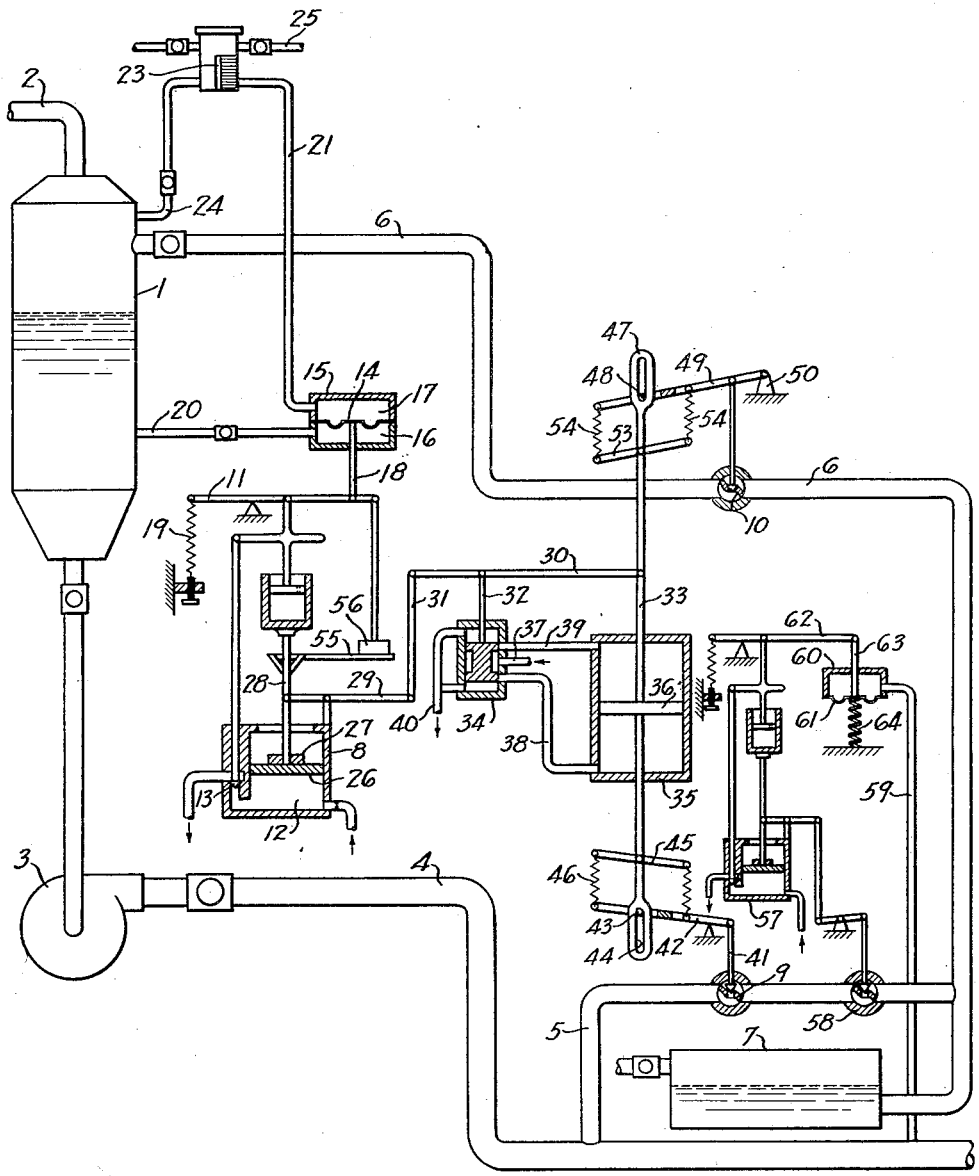
INVENTOR,
Charles H. Smoot
BY
Bartlett, Eyre, Scott & Keel
ATTORNEYS Patented Sept. 19, 1933

1,927,506

UNITED STATES PATENT OFFICE 1,927,506

CONDENSATE CIRCULATION CONTROL FOR BOILER PLANTS

Charles H. Smoot, Maplewood, N. J.; Katherine Smoot executrix of said Charles H. Smoot, deceased Application May 28, 1930. Serial No. 456,782

7 Claims. (Cl. 60—94)

My present invention relates to the regulation of the supply of condensate to feed water pumps of a boiler plant and comprises a novel system arranged to correct for variations in the circulating system due to changes in the load upon the turbines and to regulate the pressure in the condensate pump discharge header to avoid formation of steam in the suction of the feed water pumps. The regulating system which I have devised insures a smooth operation of the various auxiliaries of a feed water system and so regulates the addition of make-up water to the system as to insure economy and safety of operation of each pumping unit of a plant.
More specifically, my invention comprises a regulator responsive to the level of the water in the hot well and arranged to control valves in the make-up and draw-off lines leading from the distilled water supply and a second regulator responsive to the condensate pump discharge pressure arranged to maintain this pressure above any desired minimum by adjustment of a second valve in the draw-off line. For a better understanding of the invention, reference may be had to the accompanying drawings, of which Fig. 1 illustrates a feed water unit provided with a regulating system arranged according to the invention, and Fig. 2 is a view illustrating a modified form of one element of one of the regulators of Fig. 1.

Referring to Fig. 1, a hot well 1, which may be one of a plurality of similar wells of a boiler plant, receives condensate through a pipe 2 from one of the turbines (not shown) of the plant. A constant speed pump 3 withdraws condensate from the hot well and delivers the same as feed water through the header 4 to the boiler feed pumps. Branching from the header 4 is the draw-off line 5 connecting with the make-up line 6 leading to the distilled water tank 7. The arrangement above described forms no part of my invention but is an example of the type of feed water system to which my invention may be advantageously applied. To insure a substantially uniform water level in the well 1 and consequent smooth operation of the entire system, I provide a regulator 8 arranged to control valves 9 and 10 in lines 5 and 6, respectively. Regulator 8 is preferably of the anti-hunting type and comprises a pivoted balance lever 11 adapted upon displacement to vary the pressure of auxiliary power fluid supplied to a chamber 12 by control of the position of a throttle valve 13 connected to the lever 11 and controlling the leakage of fluid from chamber 12. A diaphragm 14, dividing a casing 15 into two chambers 16 and 17, is connected to one end of lever 11 by means of a rod 18 and transmits to the lever a force varying with the differential of the pressures in these chambers. A manually adjustable spring 19 connected to the other end of the lever 11 adds a force to the lever in a direction to oppose that due to the pressure differential. Chamber 16 is connected by means of a pipe 20 to the hot well 1 beneath the level of the water therein and receives therefore a pressure varying with the height of the water in the well and with the pressure acting upon the surface thereof. Chamber 17 is connected by means of a pipe 21 with a constant level device 22 to receive therefrom a pressure varying only with the pressure above the water in the hot well. The device 22 comprises a chamber divided by a partition 23 into two compartments, one of which is connected with the upper end of the hot well by means of a pipe 24, and the other of which is filled with water up to the top of the partition 23 by water supplied through a pipe 25. Pipe 21 is connected to the compartment containing water at the constant level of the partition 23 whereby chamber 17 receives a constant pressure equal to the constant head of water in this compartment and in pipe 21 and a variable pressure equal to that above the water in the hot well. The pressure differential between chambers 16 and 17 will thus vary solely with the water level in the hot well, decreasing with increasing water level, and increasing with decreasing water level.

Returning now to regulator 8, movement of lever 11 under the above described forces is arranged to cause movement of a power piston 26 by variation of the pressure in chamber 12; piston 26 forming the movable upper wall of this chamber, and biased to its lowermost position by a weight 27. A piston rod 28 carried by piston 26 has linked thereto a power arm 29 pivoted on a fixed part of the regulator. A floating lever 30 is connected to power arm 29 by means of a link 31 and is likewise connected to the piston rods 32 and 33 of a pilot valve 34 and relay cylinder 35, respectively. The arrangement is such that a clockwise movement of arm 29 occasioned by upward movement of piston 26 causes movement of the piston of the pilot valve 34 in a direction to supply pressure fluid beneath the piston 36 of relay cylinder 35 by connecting supply pipe 37 with pipe 38 and to drain the upper part of relay cylinder 35 by connecting pipe 39 with the drain pipe 40. Movement of the piston 36 operates to close the pilot valve by rocking of lever

30 about its connection with link 31. Conversely, counterclockwise rotation of arm 29 occasioned by downward movement of piston 26 causes opening of pilot valve 34 in a direction to cause downward movement of piston 36 followed by closure of the pilot valve.

Movement of piston 36 is arranged to successively operate valves 9 and 10 in the following manner. The stem 41 of valve 9 is linked to one end of a pivoted lever 42, the other end of which is bifurcated and carries a pin 43 slidable in a slot 44 in the lower end of the rod 33. A cross bar 45 fastened to the rod 33 and connected to lever 42 by springs 46 bias lever 42 toward closed position of valve 9. Similarly the upper end of rod 33 is provided with an elongated slot 47 in which is movable a pin 48 connected between two parts of a bifurcated lever 49, movement of which about its pivot 50 operates the valve 10. A member 53 mounted on rod 33 and connected to lever 49 by springs 54 biases valve 10 toward closed position.

With piston 36 in the mid-position illustrated, valves 9 and 10 are both closed, with pins 43 and 48 in contact with the inner ends of slots 44 and 47 respectively. Downward movement of the piston 36 causes extension of springs 54 but no movement of lever 49 as valve 10 being already closed, stem 52 prevents downward movement of lever 49. The downward movement of rod 33 causes tipping of lever 42 and gradual opening of valve 9. Conversely, upon return of piston 36 to mid-position, valve 9 is closed and upon continued upward movement of the piston, springs 46 are extended, valve 9 remains closed and valve 10 is gradually opened by clockwise rotation of lever 49.

Instead of the above described simple arrangement, other means for successively operating valves 9 and 10 upon movement of piston 36 as by lost motion devices and quadrant gearing could be as readily employed.

The regulating system above described operates upon a change in water level in hot well 1 as follows: Assuming an increase in level, occasioned by turbine load variations, and assuming valves 9 and 10 both closed, as shown, the pressure differential acting upon diaphragm 14 is reduced and spring 19 thereupon overbalances the force transmitted to lever 11 by rod 18. Lever 11 then tips in a counter clockwise direction, slightly raising valve 13 and thereby reducing the pressure in chamber 12. Weight 27 then forces piston 26 downwardly and arm 29 is tipped in a counterclockwise direction, causing operation of pilot valve 34 in a direction to connect pipes 37 and 39 and to connect pipes 38 and 40, whereby pressure fluid is supplied above piston 36 and drained from below this piston. Piston 36 thereupon descends causing partial opening of valve 9 and closure of pilot valve 34. The opening of valve 9 increases the withdrawal of water from the hot well and thereby lowers the level therein until balance is re-established upon the lever 11 of regulator 8. The water drawn off through pipe 5 is returned to the tank 7 until again required in the system. Should the valve 9 not be sufficiently opened by the above operation, lever 11 will remain unbalanced and the operation will be repeated until the level in the hot well is that desired. If, on the other hand, the level in the hot well drops to too low a value, lever 11 will be tipped in a clockwise direction to increase the pressure beneath piston 26 and to thereby cause operation of the pilot valve in a direction to cause upward movement of relay piston 35 to first close valve 9, and, if this is not sufficient to restore the desired level in the hot well, to open valve 10 in the make-up line 6, whereupon additional water is added to the hot well to restore the level therein.

If desired, the regulating system above described may be arranged to permit any desired variation in level before coming into operation, while insuring that the level will be held between fixed maximum and minimum limits.

In Fig. 2 I have illustrated the system arranged for permitting this level variation in the hot well. Fig. 2 differs from Fig. 1 only in that parts are added to regulator 8. These parts comprise a cross bar 55 rigidly secured to the piston rod 28 of the regulator and a weight 56 partly carried by one end of the bar 55 and partly suspended from the lever 11. In operation, the tension of spring 19 is so adjusted that with the level in the hot well mid-way between the desired minimum and maximum levels, about one-half of the weight 56 is active upon the lever 11 and the piston 36 of the relay cylinder is in its mid-position with valves 9 and 10 both closed. If now the level in the hot well rises, the differential pressure acting on diaphragms 14 decreases tending to cause tipping of lever 11 in a counter clockwise direction. This decreases the pressure beneath piston 26, which, except for the provision of weight 56, would descend sufficiently to open pilot valve 34. The moment, however, that piston 26 starts downward, the support of weight 56 by bar 55 is removed so that lever 11 is immediately restored to balance and the pilot valve is prevented from operating. It will thus be seen that not until the level increase in the hot well is of such a magnitude that the decrease in the pressure differential on diaphragm 14 more than offsets the additional force added to the lever by the removal of bar 55 from contact with weight 56 will the pilot valve be opened. Conversely, a decrease in water level, increasing the pressure differential upon diaphragms 14 will merely operate to cause bar 55 to support the entire weight 56 and will not cause operation of the pilot valve until the level is so low that the pressure differential alone will overpower the force of spring 19 upon lever 11. The magnitude of weight 56 is, of course, chosen according to the range in water level variation desired; the smaller the weight the smaller the range of level variation before operation of the valves 9 and 10.

Preferably I combine with the regulation responsive to the hot well level, a regulator arranged to maintain the pressure in the condensate discharge header above a predetermined value to prevent formation of steam in the suction of the feed water pumps. In the drawings such a regulator is shown at 57 and comprises a structure substantially similar to regulator 8 and arranged to directly operate a valve 58 in the draw-off line 5 in response to the pressure in the header 4 as transmitted by a pipe 59 to a chamber 60. Chamber 60 is closed by a diaphragm 61 connected to the balance lever 62 of the regulator by a rod 63. A compression spring 64 acting beneath the diaphragm 61 opposes movement thereof upon increase in pressure in chamber 60. The operation of regulator 57 is substantially similar to that of regulator 8. Upon decrease in pressure in header 4, spring 64 tips lever 62 in a direction to decrease the pressure beneath the weighted power piston of the regulator and to thereby cause counter clockwise rotation of the power arm in a direction to close valve 58 and to thereby increase the pressure delivered by pump 3. As regulator 57 operates a valve in series with the valve 9 in the draw-off line, it will be noted that it operates solely to insure that regulator 8 will not reduce the pressure in the condensate header 4 by too great an amount. During normal operation of the system, when valves 9 and 10 are closed, regulator 57 is, of course, ineffective, but is effective only at such times as there is the danger of too low a pressure in the header 4; viz., when valve 9 is open.

I have now described my complete regulating system for the pumping units of a boiler plant as applied to the regulation of a single unit. When additional units are provided, I propose to regulate each in response to the level in the hot well thereof. Obviously various changes in the construction of the regulators and in the arrangement thereof could be made without departing from the broad principles of my invention which are concerned primarily with hot well level responsive means for controlling the make-up and draw-off of water to the hot well of a boiler feed water unit.

The means described for permitting variation in water level throughout a predetermined range are susceptible of use with other than level regulators, but no claim is made herein for such means except in combination with hot well level regulation.

I claim—

1. In a feed water unit of a plant including a hot well receiving condensate from steam utilizing devices and supplying the same under pressure as feed water to a condensate header, and make-up and draw-off lines from said hot well and condensate header respectively, a regulating system for the unit comprising valves in said make-up and draw-off lines, a regulator for said valves responsive to the level of the water in said hot well, a second valve in said draw-off line and a regulator therefor responsive to the pressure in said condensate header.

2. In combination with a hot well and make-up and draw-off lines therefrom, a regulating system including a valve in each of said lines, a regulator for said valves including a balance lever subjected to a constant force and to a force varying inversely with the water level in said well, and means for operating said valves successively by continued operation of said regulator due to unbalance of forces upon said lever.

3. The combination according to claim 2 wherein operation of said valves is prevented during a predetermined range of water level variation in said well by means including a weight normally partially suspended from said lever and adapted to be entirely suspended or removed therefrom before operation of said valves by said regulator.

4. The combination according to claim 2 including a condensate header receiving water from said well, a second valve in said draw-off line and a regulator responsive to the pressure in said header adapted to close said second valve upon decrease in said header pressure.

5. In a feed water unit of a plant including a hot well receiving condensate from steam utilizing devices and supplying the same under pressure as feed water to a condensate header, a regulating system for said unit comprising in combination means responsive to the level of water in said well adapted to maintain any desired water level therein and means responsive to the pressure in said header adapted to maintain said pressure above a desired minimum.

6. In combination with a hot well and make-up and draw-off lines therefrom, a valve in each of said lines, a relay cylinder provided with a piston and a piston rod, biasing means tending to hold said valves in closed position, lost motion connecting means between said piston rod and said valves whereby both valves are closed when said piston is in mid-position and movement of said piston from mid-position opens one valve while permitting the other valve to be held closed by said biasing means, and a regulator responsive to the level of water in said hot well for causing movement of said piston upon departure of the water level from a desired value.

7. The combination according to claim 6 including means associated with said regulator adapted to prevent movement of said piston except when said water level falls below a predetermined minimum or exceeds a predetermined maximum level.

CHARLES H. SMOOT.